June 1, 1954

H. YATES 2,679,939

CONTRIVANCE FOR ROTATING CYLINDRICAL OBJECTS

Filed June 13, 1951

INVENTOR
HERBERT YATES
By Francis E. Boyer
ATTORNEY

Patented June 1, 1954

2,679,939

UNITED STATES PATENT OFFICE 2,679,939

CONTRIVANCE FOR ROTATING CYLINDRICAL OBJECTS

Herbert Yates, Kingsbury, London, England

Application June 13, 1951, Serial No. 231,308

4 Claims. (Cl. 214—1)

This invention relates to a contrivance for rotating cylindrical objects, such as cylindrical tanks and pipes, for instance whilst being circumferentially welded or paint or metal sprayed, and its object is to provide a portable contrivance of this kind which can be applied to cylindrical objects of various diameters and which can rotate them at various surface speeds.

The cylinder rotator, according to the invention, comprises a pair of rollers on laterally separated axes mounted in and with their peripheries protruding from a frame, means mounted on the frame for rotating at least one of the rollers through a large range of speeds, and a stationary anti-friction strap embracing and drawing the cylinder against the rollers.

Preferably the rollers, which are for instance rubber-covered friction rollers, are both driven to rotate in the same direction at the same peripheral speed of the large range of speeds.

The cylinder is clasped by the embracing anti-friction strap against the driven friction rollers whereby it is rotated at the desired speed.

The cylinder, if too long to be supported solely by the strap and rollers against which it is clasped, can be supported at its overhanging ends on rollers extraneous to the contrivance.

The frame, from the end of which the driven friction rollers protrude, for instance is arranged to present the end bearing the rollers either laterally against or upwardly beneath the cylinder clasped thereagainst by the embracing anti-friction strap. In the latter case the cylinder is wholly or mainly supported on the friction rollers, as well as being rotated by them.

The face of the frame, for instance an end face as already mentioned, towards which the cylinder is clasped, is concavely profiled so as not to come into contact with any cylinder of a size likely to be rotated by the contrivance.

The axes about which the friction rollers rotate are laterally separable to permit the rollers to engage cylinders of considerably different diameters, the rollers bearing against a cylinder near, but not actually at, opposite ends of a diameter of the cylinder. For this purpose the spindles of the friction rollers may be non-rotating and inserted through alternative holes at different distances apart in side cheek plates of the frame.

The anti-friction cylinder-embracing strap, for instance is composed of one or more interhinged links, each consisting of a pair of parallel curved bars, with two rollers mounted on transverse spindles between the two parallel bars of each link of the strap with their peripheries protruding to bear anti-frictionally against the periphery of the cylinder. Two anti-friction rollers are preferred, in order to avoid the bars rocking into contact with the periphery of the cylinder, and also because with two rollers both can always be so spaced as to make contact with the periphery of a cylinder of whatever diameter.

The ends of the anti-friction strap are resiliently anchored to the frame, for instance by screw-threaded stems bearing by nuts thereon against helical compression springs and encountering stiffer stop springs, so as to yield on the passage of slight protuberances on the cylinder. Both ends of the anti-friction strap are, preferably, so adjustably yieldingly anchored that the strap clasps the cylinder symmetrically.

The driving adjustable friction rollers are, for instance, driven by pitch chains and sprocket wheels on the worm wheel spindle of a worm gear in a casing sliding in the frame, and driven through a telescopic shaft, through another worm gear and an infinitely variable-speed gear, by a constant-speed reversible electromotor.

The friction rolers are preferably duplicated so as to bear against an ample length of the cylinder.

A representative example of a cylinder rotator constructed according to the invention, is shown somewhat diagrammatically in the accompanying drawings, in which:

Fig. 1 is a side elevation,

Fig. 2 an end elevation, and

Fig. 3 a plan of the cylinder rotator.

On a larger scale:

Figs. 4 and 5 are sectional elevations showing a device for tightening the strap, in two positions.

On a smaller scale:

Fig. 8 is a side elevation of the variable pulley belt drive shown in Figs. 1, 2 and 3.

$a$ is a frame terminating at one end in a pair of cheek plates $b$.

Holes $c^1$, $c^2$ are provided in the cheek plates $b$, in which non-rotating spindles $d$, of pairs of rollers $e$, fast on sleeves $f$, can be alternatively inserted, so as to adjust the distance between these pairs of rollers.

The peripheries of the rollers $e$ protrude beyond the cheek plates $b$, and the cylinder, indicated by the circle $g$, is drawn against them by an anti-friction strap $h$.

The end edge surface of the cheek plates $b$, is concavely profiled at $b^1$ so as not to come into contact with the clasped cylinder $g$.

The alternative holes $c^1$ and $c^2$ are provided in the cheek plates $b$ to permit the peripheries of the pairs of rollers $e$ to be brought closer together or separated further apart to suit cylinders of different diameters.

The anti-friction cylinder-embracing strap $h$ is composed of one or more links, each composed of a pair of parallel curved bars $h^1$, hingedly connected together by a pin and hook joint $h^2$, with two anti-friction rollers $h^3$ mounted on transverse spindles between the two bars $h^1$ of each link. The ends of the anti-friction strap $h$ are connected, by their respective pin and hook joints $h^2$, each to the end of a long screw stem $i$. Each screw stem $i$ extends through a collar $j^1$ formed in a cross bar $j$, swivelling in the cheek plates $b$ at opposite sides of the longitudinal axis of the frame $a$.

Each screw stem $i$ is drawn by a handwheel nut $k$, thereby tightening the strap $h$. The screw stems $i$ and the strap $h$ are resiliently drawn by the nuts $k$ through an interposed helical compression spring $l^1$. A resilient stop to be encountered by the respective handwheel nut $k$ is provided by a shorter but stiffer helical spring $l^2$, Figs. 4 and 5, surrounding each spring $l^1$ and which is encountered by the respective handwheel nut $k$ when screwed up.

Figure 4:
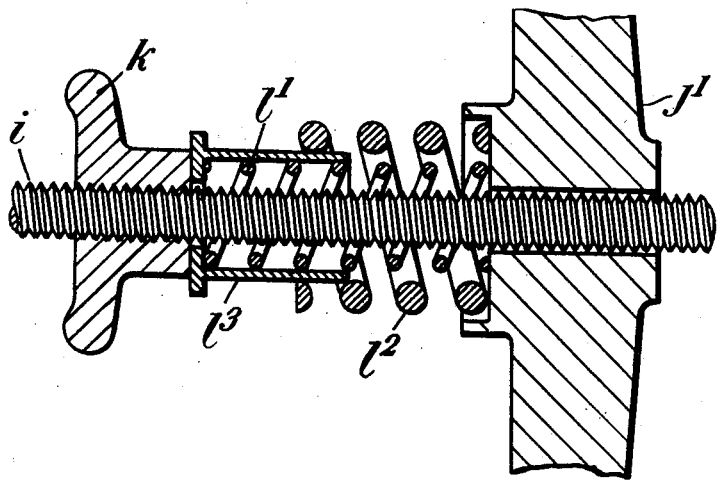
Figure 5:
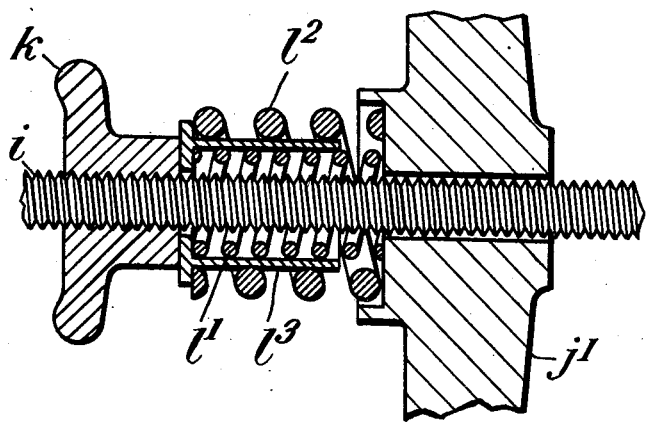

The two springs $l^1$, $l^2$ are of opposite twist to prevent fouling and, as shown in Figs. 4 and 5, are also separated by an interposed still shorter metal sleeve $l^3$, flanged to provide a washer interposed between the nut $k$ and the springs $l^1$, $l^2$.

The stiffer stop spring $l^2$ enables the strap $h$ to yield should its rollers $h^3$ encounter slight protuberances on the cylinder $g$.

Figure 6:
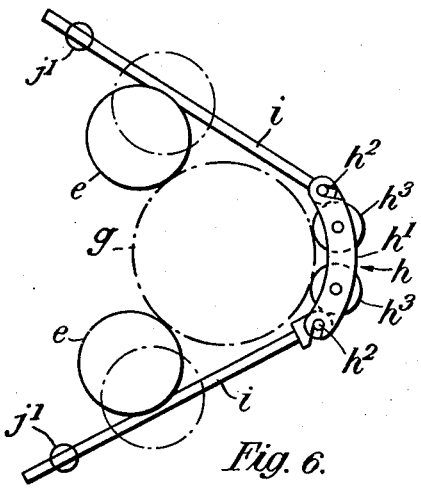
Figs. 6 and 7 are diagrammatic side elevations showing how the rotator can hold and rotate cylinders respectively of smaller and larger diameter than that indicated in Fig. 1.
Figure 7:
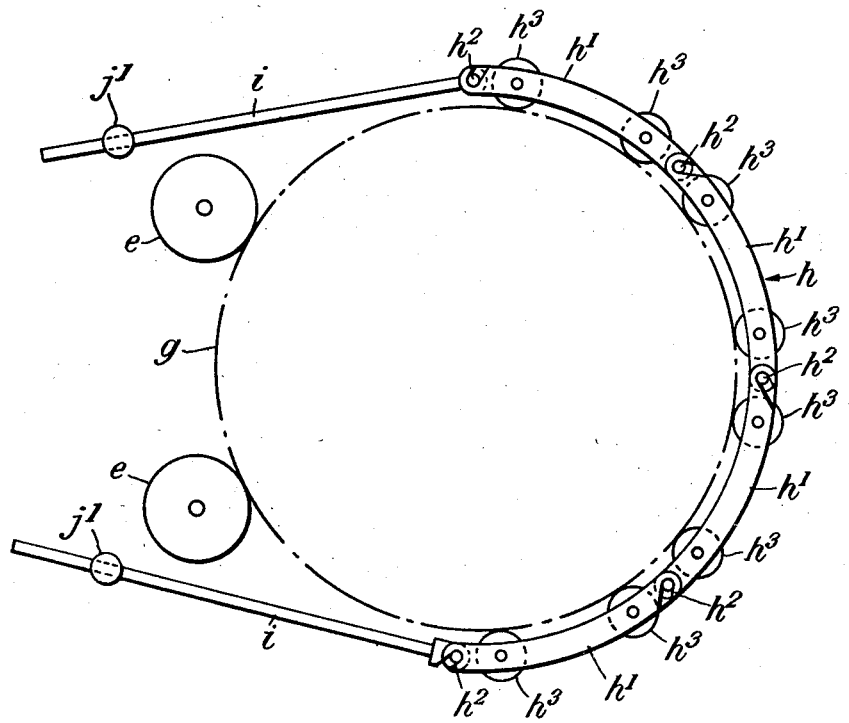

For smaller and larger diameter cylinders, the non-rotating spindles $d$ of the friction rollers $e$, can be shifted from one to the other of the holes $c^1$, $c^2$, and the anti-friction strap $h$ can be shortened and lengthened by reducing or increasing the number of links as indicated in Figs. 6 and 7. These views also show how the swivelling cross bars $j$ permit the long screw stems $i$ to adjust themselves angularly.

The two pairs of friction rollers $e$ are driven by a separate pitch chain $m$, led around a sprocket $n$ on the sleeve $f$ of each, and around a different sprocket $o$, on each end of the spindle of the worm wheel of a worm gear, $p^4$, $p^5$ contained in a casing $p$. The worm gear casing $p$ is mounted on a carriage $p^1$, which is adjustable into two alternative positions longitudinally along the frame $a$, to maintain the pitch chains $m$ taut, whatever the holes $c^1$ or $c^2$ into which the non-rotating spindles $d$ of the friction rollers $e$, have been inserted.

The carriage $p^1$ is held in its alternative positions by a removable screw pin $p^2$, inserted through holes in the guides in which the carriage slides and engaged in alternative holes $p^3$ in the carriage $p^1$.

In its longitudinal displacements, the worm gear casing $p$ displaces the spindle of its worm wheel $p^4$, on which the sprockets $o$ are fast, along the longitudinal axis of the frame $a$, which axis bisects the angle formed by the axis of the sprockets $o$ with the axes of the sprockets $n$ and friction rollers $e$.

The worm gear $p^4$, $p^5$ in the casing $p$ is driven through a telescopic shaft $q$, extending from the spindle of the worm wheel $r^1$ of another worm gear $r^1$, $r^2$ contained in a casing $r$, which is mounted stationary in the frame $a$. The worm $r^2$ of this, second, worm gear $r^1$, $r^2$, in the casing $r$, is fast with a pulley $s$, driven through a belt $t$ from the output pulley $u$ of an infinitely variable speed gear $v$ of the expanding pulley type, having a range, for instance, of 10:1. The input pulley $w$ of this variable speed gear $v$, is driven, through a belt drive $x^1$, $x^2$, by a constant speed reversible electromotor $y$, of fractional horse power, mounted stationary in the frame $a$.

Figure 1:
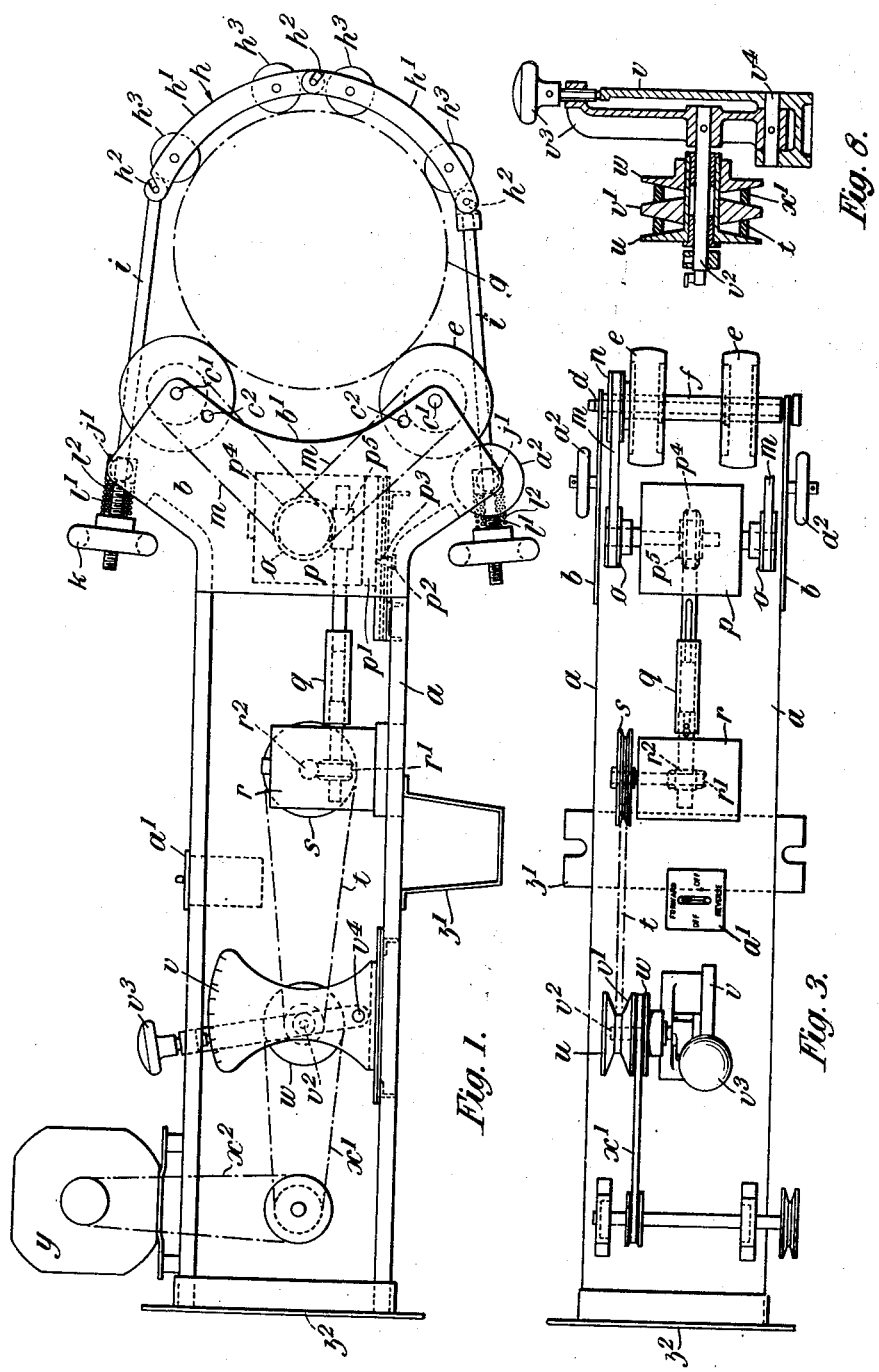
Figure 2:
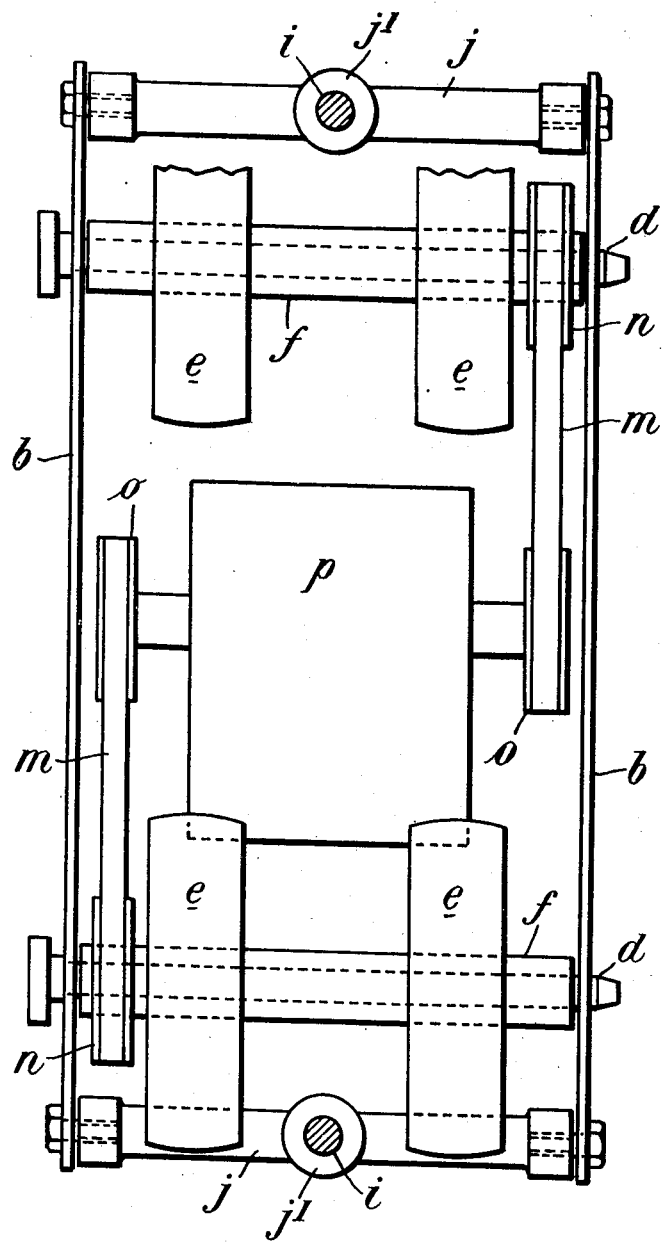

The input and output pulleys $w$ and $u$ of the variable speed gear $v$ are, as shown more clearly in Fig. 8, constituted, in the known manner, by a conical pulley flange $u$ and a conical pulley flange $w$, between which slides a doubly conical pulley flange $v^1$, all keyed a shaft $v^2$ projecting laterally from a hand lever $v^3$ pivoted on a spindle $v^4$ mounted in a sector plate of the variable speed gear $v$. Angular displacement of the hand lever $v^3$ moves the pulley shaft $v^2$ with the flanges $u$, $w$ in directions either to tighten the belt $t$ whilst slackening the belt $x^1$ or to tighten the belt $x^1$ whilst slackening the belt $t$. The tightened belt $t$ or $x^1$ forces the loose pulley flange $v^1$ sideways so that the slackened belt $x^1$ or $t$ is caused to ride radially up its respective pulley flange $u$ or $w$, thus varying the gear ratio. In Figs. 1 and 3 the hand lever $v^3$ has been moved to tighten the belt $t$ and slacken the belt $x^1$ so that the flange $v^1$ has been displaced towards the flange $w$, whereas in Fig. 8 the flange $v^1$ is shown in the midway position between the flanges $u$ and $w$.

Instead of being driven by an electromotor, the cylinder rotator can be driven by a fluid-pressure engine, such as a compressed air motor. With some types of compressed air motor, change of speed can be effected by change of the engine speed, whereby a variable speed gear is obviated.

Alternative feet $z^1$, $z^2$ are provided on the frame $a$. One foot $z^1$ projects at right angles to the longitudinal axis of the frame $a$ and is bolted to the floor of the workshop, to resist a lifting torque when the longitudinal axis of the frame $a$ is horizontal with the friction rollers $e$ directed laterally as shown. The other foot $z^2$, at the end of the frame $a$ remote from the friction rollers $e$, is used for standing the frame $a$ upright on end with the rollers $e$ directed upwards.

In practice, the frame $a$ is braced by internal rectangular frames at intervals, and also is clad to a large extent with sheet metal, both of which features, for the sake of clearness, are not shown.

On the clad frame, a control panel $a^1$, Figs. 1 and 3, is mounted. $a^2$ are wheels on which the contrivance can be wheeled about.

I claim:

1. In a cylinder rotator, a frame terminating at one end in a pair of cheek plates formed with differently laterally separated pairs of holes, a pair of friction rollers between said cheek plates with their peripheries protruding therefrom, spindles of said rollers insertable in alternative pairs of said holes of said cheek plates, a sprocket fast with each of said rollers, a worm gear in a casing displaceable longitudinally along said frame relatively to said rollers, sprockets on the worm wheel spindle of said worm gear, pitch chains connecting said sprockets fast with said rollers each to a seperate sprocket of said sprockets on said worm wheel spindle, a telescopic shaft connected to the worm spindle of said worm gear, a worm wheel of a worm gear stationary in said frame and connected to said telescopic shaft, a motor fast with said frame, speed-reducing belt drives connecting said motor to the worm spindle of said stationary worm gear, and a stationary anti-friction strap anchored at its ends to said cheek plates of said frame and located to embrace and draw the cylinder against said rollers.

2. In a cylinder rotator as claimed in claim 1, screw stems extending from the ends of said anti-friction strap, collars swivelling on said cheek plates through which said screw stems extend, nuts on and drawing said screw stems, helical compression springs on said screw stems between said collars and said nuts, and stiffer and shorter helical stop springs also interposed on said screw stems between said collars and said nuts.

3. In a cylinder rotator, a frame terminating at one end in a pair of cheek plates formed with differently laterally separated pairs of holes, a pair of friction rollers between said cheek plates with their peripheries protruding therefrom, spindles of said rollers insertable in alternative pairs of said holes of said cheek plates, a sprocket fast with each of said rollers, a worm gear in a casing displaceable longitudinally along said frame relatively to said rollers, sprockets on the worm wheel spindle of said worm gear, pitch chains connecting said sprockets fast with said rollers each to a separate sprocket of said sprockets on said worm wheel spindle, a telescopic shaft connected to the worm spindle of said worm gear, a worm wheel of a worm gear stationary in said frame and connected to said telescopic shaft, a motor fast with said frame, speed-reducing belt drives connecting said motor to the worm spindle of said stationary worm gear, a variable speed gear included in said belt drives, and a stationary anti-friction strap anchored at its ends to said cheek plates of said frame and located to embrace and draw the cylinder against said rollers.

4. In a cylinder rotator as claimed in claim 3, screw stems extending from the ends of said anti-friction strap, collars swivelling on said cheek plates through which said screw stems extend, nuts on and drawing said screw stems, helical compression springs on said screw stems between said collars and said nuts, and stiffer and shorter helical stop springs also interposed on said screw stems between said collars and said nuts.

References Cited in the file of this patent

UNITED STATES PATENTS

| Number | Name | Date |
|---|---|---|
| 1,879,346 | Lawrence | Sept. 27, 1932 |
| 1,894,835 | Smith et al. | Jan. 17, 1933 |
| 1,925,383 | Hickey | Sept. 5, 1933 |
| 1,992,812 | Chapman | Feb. 26, 1935 |
| 2,077,277 | Smith | Apr. 13, 1937 |
| 2,242,448 | Bucknam et al. | May 10, 1941 |
| 2,284,711 | Anderson | June 2, 1942 |
| 2,460,671 | Benedick | Feb. 1, 1949 |
| 2,557,202 | Raymond et al. | June 19, 1951 |